No. 842,336. PATENTED JAN. 29, 1907.
V. QUAEDVLIEG.
TOOL CYLINDER FOR MACHINES FOR UNHAIRING HIDES.
APPLICATION FILED FEB. 23, 1905.

Witnesses.
Robert Adt
C. F. Fuss

Inventor
Victor Quaedvlieg,
per F. H. Richards,
Attorney.

UNITED STATES PATENT OFFICE.

VICTOR QUAEDVLIEG, OF STADLAU, NEAR VIENNA, AUSTRIA-HUNGARY.

TOOL-CYLINDER FOR MACHINES FOR UNHAIRING HIDES.

No. 842,336.　　　　　Specification of Letters Patent.　　　　Patented Jan. 29, 1907.

Application filed February 23, 1905. Serial No. 246,821.

*To all whom it may concern:*

Be it known that I, VICTOR QUAEDVLIEG, a subject of the Queen of the Netherlands, residing in Stadlau, near Vienna, in the Province of Lower Austria and Empire of Austria-Hungary, have invented certain new and useful Improvements in Tool-Cylinders for Machines for Unhairing Hides, of which the following is a specification.

In the machines hitherto used in tanneries for unhairing the suitably-prepared hides and skins the tool-cylinder is provided with helical blunt knives. By being acted upon by these rigid knives the softened hides are strongly strained or racked to their disadvantage, and the present invention is designed to obviate this drawback.

According to the invention a tool-cylinder is used having longitudinal rows of knives separated from each other by suitable intervals and secured to carriers which are adapted to swing round pivots and to yield elastically every time a knife passes over a thicker portion of the hide under treatment. The intervals between the knives in each row face knives in the neighboring rows, so that the hide is accordingly acted upon over its full breadth.

In the preferred form of the tool-cylinder separate knives are removably secured to pivoted carrier-arms held in radial positions by springs.

Figure 1:
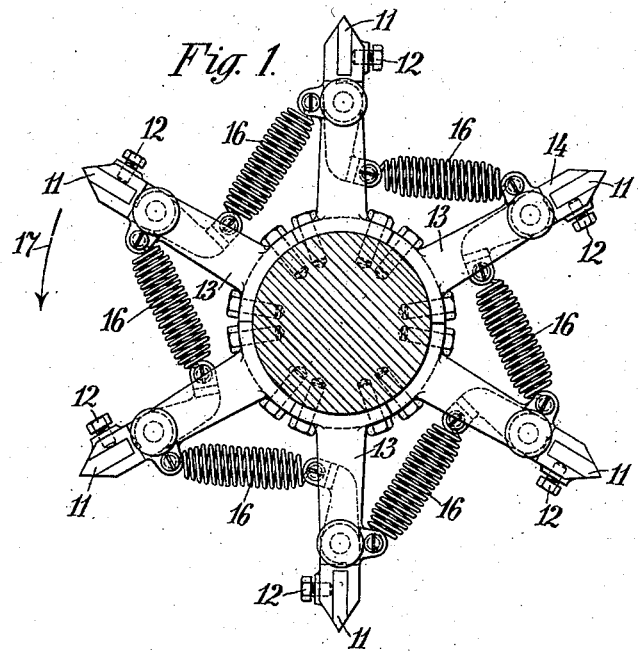
Figure 2:
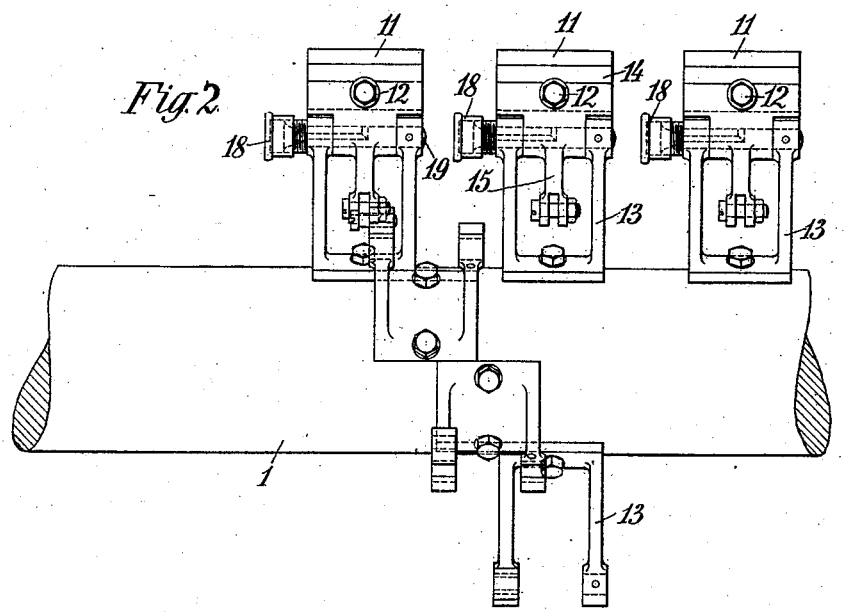

In the annexed drawings, Figure 1 is a cross-section of a tool-cylinder provided with pivoted spring-controlled knife-carriers; and Fig. 2 is a front elevation of a portion of this tool-cylinder, showing only some knife-carriers and some brackets for the same.

In the form of tool-cylinder shown herein the knives 11, made of suitable material— such as stone, steel, or brass—are exchangeably inserted into resilient carriers and kept in position by clamping-screws 12. Each such carrier comprises a two-cheeked bracket 13, rigidly connected, by means of screws, with the cylinder 1, and a two-armed lever 14 15, pivoted between the cheeks of the bracket. The outer arm 14 of each lever has its free end made up into a knife-seat, and the inner arm 15 is by means of a coiled spring 16 connected with a bracket 13, which with respect to the direction of rotation (indicated by the arrow 17) is placed behind the lever in question.

At 18 grease-boxes are shown by means of which the pivots 19 can be lubricated.

Having thus described my invention, what I claim, and desire to secure by Letters Patent of the United States, is—

In a device for unhairing hides, the combination with a cylinder, of a number of carriers mounted thereon, each comprising a pair of brackets rigidly connected with the cylinder, a lever pivoted to said brackets and carrying at its outer end a knife-seat, a knife removably secured in said seat, and an extension-spring connected to the other end of said lever and to one of the brackets of a rearwardly-disposed carrier.

In witness whereof I have signed this specification in presence of two witnesses.

VICTOR QUAEDVLIEG.

Witnesses:
　　VICTOR KERPL,
　　ALVESTO S. HOGUE.